Figure 1:
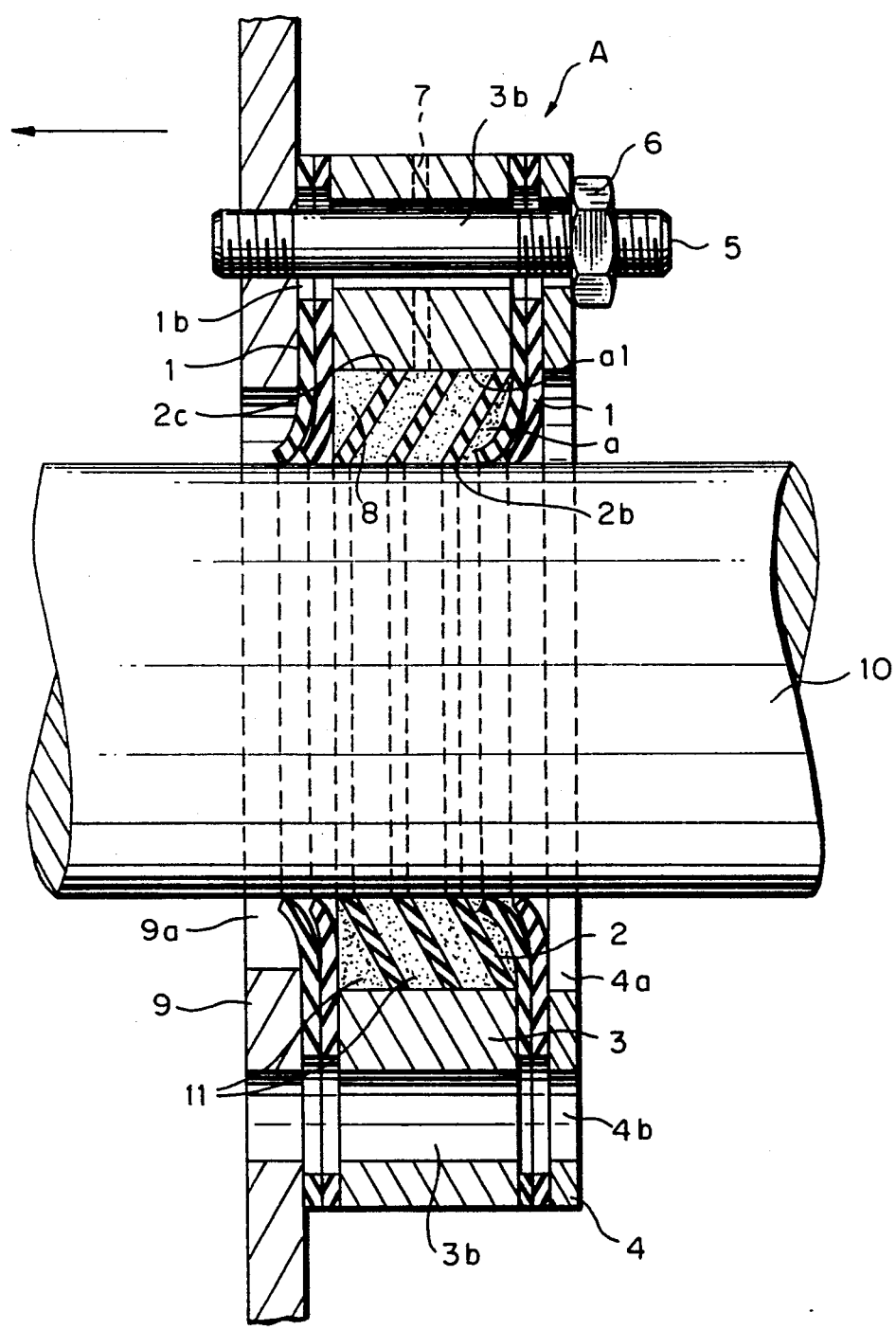

United States Patent [19]
Erdal

[11] Patent Number: 5,207,794
[45] Date of Patent: May 4, 1993

[54] SEAL ASSEMBLY FOR A SHAFT COMPRISING A STUFFING BOX

[75] Inventor: Jan H. Erdal, Kristiansand, Norway

[73] Assignee: Tor Birger Krageboen, Tveit, Norway

[21] Appl. No.: 884,349

[22] Filed: May 18, 1992

[51] Int. Cl.$^5$ .............................................. F16J 15/32
[52] U.S. Cl. .......................................... 277/4; 277/47; 277/59; 277/152
[58] Field of Search .................... 277/4, 47, 51, 53, 58, 277/59, 60, 66, 152, 158, 95, 84, 31, 123, 121, 116.8

[56] References Cited

U.S. PATENT DOCUMENTS

| | | | |
|---|---|---|---|
| 1,634,891 | 7/1927 | Trout | 277/66 |
| 2,217,038 | 10/1940 | Alley | 277/116.8 |
| 2,625,446 | 1/1953 | Bjornstad | 277/4 |
| 2,903,281 | 9/1959 | Avery | 277/205 |
| 3,084,946 | 4/1963 | Sharp | 277/121 |
| 3,194,571 | 7/1965 | Peickii et al. | 277/184 |
| 3,288,164 | 11/1966 | Clark | 277/4 |
| 3,359,362 | 12/1967 | Lusk et al. | 277/47 |
| 3,434,727 | 3/1969 | Kellenberger | 277/167.5 |
| 3,510,177 | 5/1970 | Shimula | 277/59 |
| 4,192,517 | 3/1980 | Torres | 277/121 |
| 4,239,245 | 12/1980 | Giglio et al. | 277/203 |
| 4,289,319 | 9/1981 | Hold et al. | 277/59 |

FOREIGN PATENT DOCUMENTS 0242699 10/1987 European Pat. Off. .
1100861 9/1955 France .................................. 277/53
1545771 5/1979 United Kingdom ............. 277/116.8

Primary Examiner—William A. Cuchlinski, Jr.
Assistant Examiner—Daniel De Pumpo
Attorney, Agent, or Firm—Browdy and Neimark

[57] ABSTRACT

A seal assembly for a shaft comprising a stuffing box having an inner circular cylindrical wall surface, for attachment on or in a wall having an opening for passage of a shaft therethrough. The seal assembly having at least one first annular sealing lip of elastic material, e.g., rubber or similar material, secured at each end section of the stuffing box and which encloses and bears resiliently against the shaft, forming acute angles therewith, the first lips defining between them an annular chamber in the stuffing box for at least one annular elastic sealing member disposed between the shaft and the inner circular cylindrical wall surface of the stuffing box. The sealing member is composed of a second annular sealing lip of elastic material corresponding to the material in the said first sealing lips, which second sealing lip is releasably and resiliently retained on the shaft for rotation therewith and extends obliquely outward toward the inner wall surface of the stuffing box, forming an acute angle with the shaft, the vertex of said acute angle is turned toward the shaft passage opening in the wall which bounds on a room having a dust- or particle-filled atmosphere and/or a moisture or fluid-filled room.

10 Claims, 3 Drawing Sheets

SEAL ASSEMBLY FOR A SHAFT COMPRISING A STUFFING BOX

The present invention relates to a seal assembly for a shaft comprising a stuffing box.

A seal assembly of the type mentioned above is known from EP-0 242 699. This seal is specially designed to withstand high pressure and is based on attaining a high contact pressure between the annular sealing elements secured against rotation and the rotating shaft. This is achieved through reduction of the sealing elements' inner diameter—which is initially greater than the shaft diameter—by the backup rings on each side of the sealing elements having been provided with opposed, parallel undulating side faces, whereby on contraction of said backup rings toward one another, the annular elastic sealing elements are urged to assume a corresponding undulated form. This causes reduction of the inner diameter of the sealing elements such that these are pressed against the shaft for sealing, gliding engagement therewith. Sealing against high pressure is thus achieved. This seal assembly does not permit eccentricity in the shaft during its rotation.

The purpose of the present invention is to provide a shaft seal for use for a shaft passing from a room having a contaminated atmosphere, e.g., dust-filled air, through an opening in a wall to another room which is to be protected from said contaminated atmosphere.

Seal assemblies for this purpose are known, for example, from U.S. Pat. No. 3,434,727. Similar seal assemblies are also known from, for example, U.S. Pat. No. 3,194,571. The known solutions, however, have a very short functional lifetime (about 3–4 weeks) when used in heavily dust filled surroundings. Frequent replacement of the seal assemblies involves considerable maintenance costs for installations having many such shaft seal assemblies, at the same time as stopping the system for the replacement is often disadvantageous. Furthermore, the known seal assemblies are poorly suited for or unable to absorb eccentricity or irregularities in a rotating shaft.

The present invention therefore proposes to solve the problems recognized thus far in a simple and inexpensive manner, rendering annual maintenance more reasonable and affording a seal assembly having a considerably longer functional life than the known devices.

The seal assembly for a shaft according to the invention is particularly well suited for use with feed screws in the chamber of a smoke purification plant in the smelting industry, but it will also be immediately understood that the shaft seal assembly shown and described herein may be used in other industrial areas where shaft sealing is a problem.

In workshop halls the working environment is often poor due to excessive leakages, particularly of dust. This necessitates frequent cleaning of the work area floor, as large quantities of dust can accumulate there. Such dust may also entail a considerable risk to health.

There are several causes of this type of leakage including, for example, the problem of eccentricity in the shaft, whereby the sealing ring becomes deformed when standing in the housing of the stuffing box. Such eccentricity could cause severe wear to the shaft if the stuffing box material were to come into contact with the shaft. Another reason the leakage may be considerable is because fans in the work premises draw in dust from chimney flues with great force and cause an overpressure. Filter bags intended for purification of the smoke become coated with dust on the outside and lose their effectiveness. Shaft eccentricity will occur when excessive moisture forms within a chamber. The dust has a tendency to become packed, whereby the shaft begins to run untrue and could suffer permanent damage.

The wearability for the previously known shaft seal assemblies for use in the smelting industry is brief, and the consumption rate for bearings is also increased as a result of dust being blown into the actual bearing house.

The purpose of the invention is thus to provide a simple solution for the problems known thus far, with the characterizing features for the invention being disclosed in the following specification and the subsequent patent claims, in addition to the references to the enclosed drawings which show the preferred embodiments of the present invention.

Figure 2:
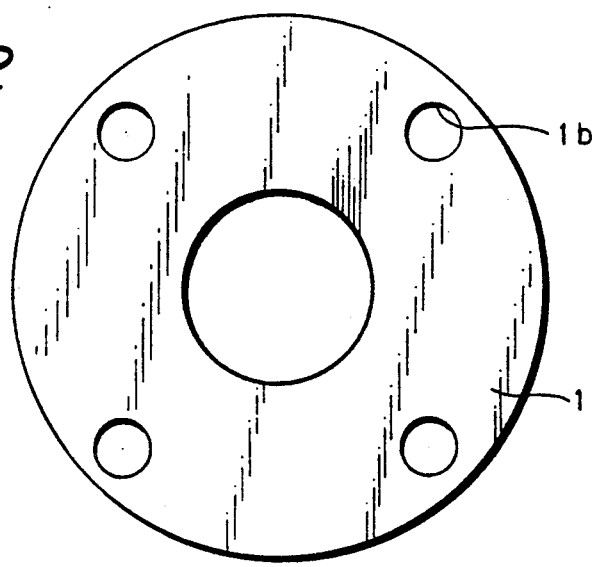
Figure 3:
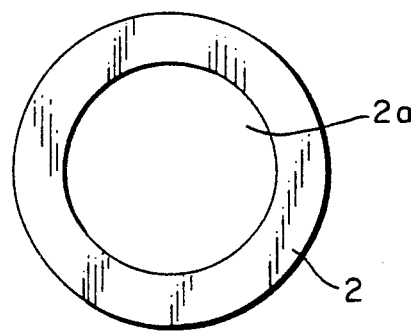
Figure 4:
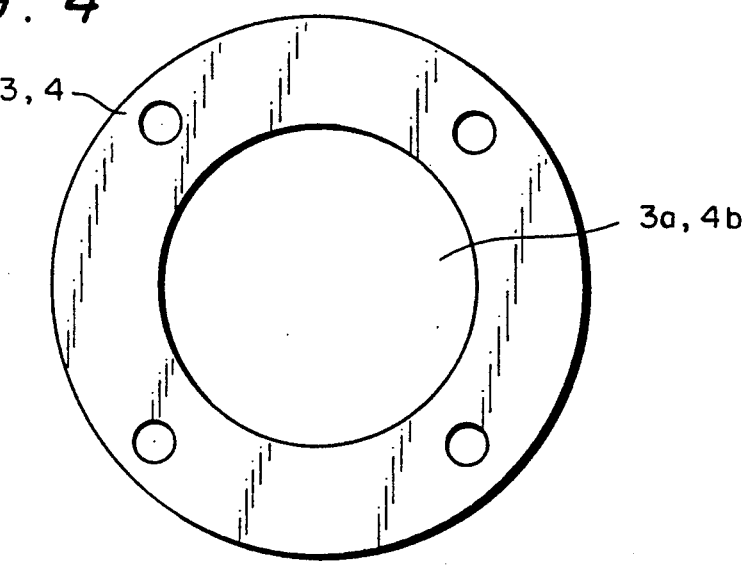

FIG. 1 shows a stuffing box 1 according to the invention in cooperation with a shaft, FIG. 2 shows an elastic sealing lip to be placed at the ends of the stuffing box, seen from the side in flat state, FIG. 3 shows an elastic sealing lip adapted for positioning between the respective end sealing lips, seen from the side and in flat state, FIG. 4 shows a rigid annular member adapted to be placed between the aforementioned end sealing lips, seen from the side.

Figure 5:
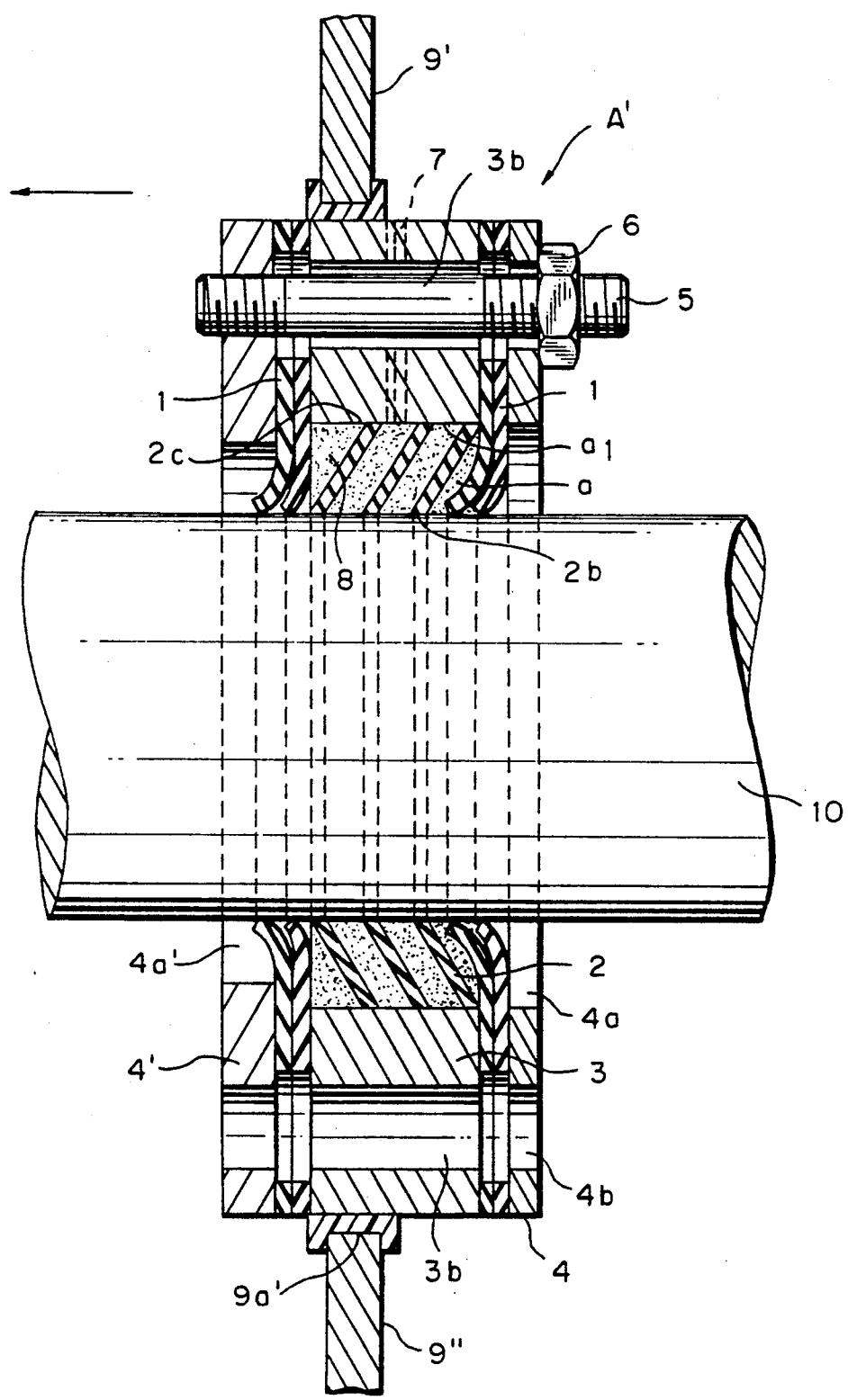

FIG. 4 also shows a clamping ring seen from the side designed for forming a wall of the stuffing box which has the same circumferential form as the annular member, and FIG. 5 shows the same as FIG. 1, with the exception that the stuffing box circumference is inserted in an opening in a wall and sealed thereagainst with an annular packing.

As shown in FIG. 1, the shaft seal assembly comprises stuffing box A having an inner circular cylindrical wall surface $a_1$ for mounting on or in a wall 9 having an opening 9a therethrough for the passage of shaft 10. At least one annular sealing lip 1 of elastic material, e.g., rubber or the like, is secured at each end section of stuffing box A and encloses and bears resiliently against shaft 10, forming acute angles therewith.

Sealing lips 1 define between them an annular chamber a in stuffing box A for at least one annular elastic sealing member disposed between shaft 10 and the inner circular cylindrical wall surface $a_1$ of stuffing box A. This sealing member is composed of an annular sealing lip 2 of elastic material similar to the material in sealing lips 1. Sealing lips 2 are releasably and resiliently retained on shaft 10 for rotation therewith, and extend obliquely outward toward the inner wall surface $a_1$ of stuffing box A, forming an acute angle with shaft 10. The acute angles formed by sealing lips 1,2 with shaft 10 are turned with the vertexes thereof toward the shaft passage opening 9a in wall 9, which bounds on a room having a dust- or particle-filled atmosphere and/or a fluid-filled chamber.

The annular sealing lip 2 in non-assembled state as shown in FIG. 3 has an inner diameter for its central opening 2a which is smaller than the diameter of shaft 10, and an outer diameter greater than the inner diameter of annular chamber a. Thus, upon axially pressuring the annular sealing lip onto shaft 10, central opening 2a of sealing lip 2 will be expanded and will effect the aforementioned resilient retention, and will cause the tilting of the side surfaces of sealing lip 2 toward shaft 10, thereby also reducing the effective outer diameter of sealing lip 2 for adaptation to the inner diameter of annular chamber a.

In the embodiment shown in FIGS. 1 and 5, three annular sealing lips 2 are arranged in spaced relationship within chamber a.

The inner wall surface $a_1$ of stuffing box A is composed of the inner circular cylindrical wall surface of a rigid cylindrical annular member 3 provided with at least two axial through-going bores 3b for engagement with stud bolts 5 disposed around the shaft passage opening 9a in wall 9. A clamping ring 4 with central opening 4a and mounting hole 4b aligned with a corresponding central opening 3a and bores 3b in annular member 3 is also adapted for engagement with stud bolts 5. The annular sealing lips 1 are adapted for retention between annular member 3, and clamping ring 4 and wall 9, respectively, said components being clamped together with the aid of nuts 6 on the ends of stud bolts 5 opposite wall 9.

Stud bolts 5 run with a clearance in bores 3b through annular member 3, which enables thereby the radial adaptation/adjustment of stuffing box A to shaft 10.

The annular sealing lip 1 extends outwardly to the exterior cylindrical surface of annular member 3 and is provided with insertion holes 1b aligned with the bores 3b in annular member 3 and thereby with stud bolts 5. The annular sealing lips 1 are thus retained against annular member 3, as mentioned above.

In an embodiment of the shaft seal as shown in FIG. 5, clamping rings 4 and 4' define annular chamber a of the stuffing box. In other words, wall 9 which constitutes one of the walls of annular chamber a in the embodiment indicated in FIG. 1 is replaced by aforementioned clamping ring 4'. Thus there is provided a complete, removable stuffing box A' for non-rotatable positioning at or in a shaft passage opening 9a' in wall 9' with the aid of appropriate mounting and sealing means.

FIG. 5 thus shows a sealing ring having a U-shaped cross-section and outwardly opening groove, which groove are placed against the edge of shaft passage opening 9a', the inner surface of said sealing ring bearing on the outer circular surface of annular member 3 in sealing engagement therewith. Annular member 3 is provided with a lubricant supply inlet 7 to annular chamber a for the supply of lubricant 8 to the interstices between sealing lips 1 and 2.

In one embodiment of the sealing lip, inner edge surface 2b on annular sealing lip 2 may form an acute angle with one of the side surfaces of sealing lip 2 facing toward shaft passage opening 9a. Similarly, the outer edge surface 2c of sealing lip 2 may form an acute angle with the other side surface of sealing lip 2 facing away from said shaft passage opening 9a. In this way, a better surface contact is attained between, respectively, shaft 10 and inner edge surface 2b of sealing lips 2, and the outer edge surface of sealing lips 2 and the inner wall surface $a_1$ of annular member 3.

The shaft seal described hereinabove is mounted on an existing shaft 10 and chamber wall 9 with cable passage opening 9a therethrough by means of, for example, four stud bolts 5 secured in corresponding threaded holes in chamber wall 9, which holes and thus said stud bolts 5 are aligned with the aforementioned holes in, respectively, cylindrical annular member 3, clamping rings 4 and annular sealing lips 1. Two rubber rings or annular sealing lips 1 are slid first onto shaft 10 and then, with their holes 1b onto aforementioned stud bolts 5. The fact that central opening 1a of sealing lips 1 has a diameter slightly smaller than the diameter of shaft 10, as mentioned above, enables the achievement of the desired curved configuration of the lips. It may be expedient, for example, to have an opening diameter that is 10 mm smaller than the diameter of shaft 10. Cylindrical annular member 3, preferably of steel, is then slid by means of its bores 3b onto the aforementioned stud bolts 5.

As is apparent from FIG. 1, central opening 3a of annular member 3 has a diameter that is substantially greater than the diameter of shaft 10. Rings or lips 2 of elastic material, e.g., rubber, are inserted onto shaft 10 and into central opening 3a of said annular member 3. Central opening 2a of lips 2 has a diameter slightly smaller than that of the shaft and preferably greater than the diameter of the opening of aforementioned lips 1. The opening diameter for lips 2 may suitably be 5 mm smaller than the diameter of shaft 10.

An additional two rings or annular lips 1 may then be slid onto shaft 10, these being of the same configuration as the first said lips 1. After that, clamping ring 4—suitably of steel—is placed on stud bolts 5 at holes 4b thereof, whereafter nuts 6 are screwed onto stud bolts 5. Tightening of the screws for secure interconnection of the previously mentioned components may take place after the bearing and bearing house (not shown) for shaft 10 are securely mounted in the desired position. The described stuffing box A will self-center automatically relative to shaft 10 because stud bolts 5, as mentioned previously, run with a clearance in bores 3b through annular member 3 and because nuts 6 have not yet been tightened, enabling the sealing lips and, with them, annular member 3 to move radially and adapt to the position of shaft 10. Nuts 6 are then tightened and the stuffing box is ready for use. While shaft 10 rotates, heat resistant grease 8 is fed into the annular chamber a of stuffing box A through lubricant supply inlet 7.

It is important that an equal number of lips 1 be disposed on either side of annular member 3. If there are used only one lip 1 on one side thereof (the outside) and two lips 1 toward chamber wall 9, the one lip situated on the outside will turn itself outwards when grease is pumped in.

It is expedient to provide lips 1 and 2 with a thin film of oil at the edge of the central opening forming the seal around shaft 10 in order thereby to facilitate the assembly task. Lips 1 are slid onto shaft 10 with the bend of the lip opposite to the position the lips are to have, said lips in their final position being drawn back slightly to reverse their curve into the opposite position, i.e., with the tip of the lip turned toward wall 9. Lips 1 and 2 shall have a bend or inclination directed the same way so that the lip edges bearing on shaft 10 will point in the direction of the dust-filled room, which in FIG. 1 is located outside wall 9.

When lips 1 are mounted, they are slid onto shaft 10 with their tilt or inclination opposite to that of their final position for use. The change in the tilt is achieved by drawing lips 1 back slightly, enabling the lip to reverse itself into the correct position.

An important feature of the shaft seal assembly according to the invention is that the stuffing box incorporated therein is substantially easier to mount on the shaft since the seals, i.e., lips 1 and 2, center themselves automatically in relation to shaft 10, as mentioned above. Thus, there is no need for adjustment, which previously has been an exact and time-consuming operation. The problem of shaft eccentricity which deforms and wears out known shaft seal assemblies has now been solved in the present invention by means of the inward-turned lips 1, which yield resiliently and thus allow shaft 10 to rotate with eccentricity. This feature, combined with the fact that lips 2 are mounted fixedly on shaft 10 and rotate together therewith within annular chamber a of stuffing box A, thus forming a type of labyrinth seal, and the fact that lubricant 11 is introduced through lubricant supply inlet 7 to the interstice between lips 1 and 2, further contributes toward attainment of an effective seal. At the same time, the lips are subjected to very little wear.

There is provided by means of the present invention a shaft seal having a long operational lifetime, which may readily be adapted without significant difficulties to shafts having poor tolerance or irregularities.

The shaft seal is constructed such that the rigid clamping ring 4 situated outermost will in no way come into contact with shaft 10, due to the fact that axial opening 4a in clamping ring 4 has a substantially greater diameter than shaft 10. Thus all danger of shaft wear against clamping ring 4 is avoided.

According to tests undertaken, the shaft seal according to the present invention tolerates about 5 bar of overpressure within the dust-filled chamber/room into which shaft 10 runs and is connected, for example, to a feed screw. The seal assembly has also been subjected to temperatures up to 150° C. without negative effects on the shaft seal.

Having described my invention, I claim:

1. A seal assembly for a shaft, said assembly comprising; a stuffing box having an inner circular cylindrical wall surface, for attachment to a wall having an opening for passage of a shaft therethrough, at least one annular sealing lip of elastic material secured at each end section of said stuffing box to close and bear resiliently against said shaft and form acute angles therewith, each said at least one annular sealing lip defining therebetween an annular chamber in said stuffing box, said annular chamber enclosing at least one annular elastic sealing member disposed between said shaft and an inner circular cylindrical wall surface of said stuffing box, said sealing member being releasably and resiliently retained on said shaft for rotation therewith and extending obliquely outward toward said inner wall surface of said stuffing box and forming an acute angle with said shaft, a vertex of said acute angle being turned toward a shaft passage opening in said wall which bounds a room having an atmosphere to be contained.

2. An assembly according to claim 1, wherein said annular sealing member in non-assembled state has an inner diameter smaller than a diameter of said shaft, and an outer diameter greater than an inner diameter of said annular chamber, whereby a central opening of said sealing member will be expanded by axially pressing said sealing member onto said shaft and effect secure retention of said sealing member to said shaft for rotation therewith, and whereby said pressing will cause the tilting of side surfaces of said sealing member toward said shaft, thereby also reducing the effective outer diameter of said sealing member for adaptation to said inner diameter of said annular chamber.

3. An assembly according to claim 2, wherein three annular sealing members are arranged mutually spaced in said annular chamber.

4. An assembly according to claim 3, wherein a lubricant supply inlet to said annular chamber, is provided for supply of lubricant to the interstices between said sealing members.

5. An assembly according to claim 1, wherein an inner edge surface on said annular sealing member in non-assembled state forms an acute angle with one of said side surfaces, which in assembled state of said sealing member is turned toward said shaft passage opening.

6. An assembly according to claim 5, wherein an outer edge surface of said annular sealing member forms an acute angle with another of said side surfaces, which in assembled state of said sealing member is turned away from said shaft passage opening.

7. An assembly according to claim 1, wherein said inner wall surface of the stuffing box is formed by an inner circular cylindrical wall surface of a rigid cylindrical annular member provided with at least two axial through-going bores for engagement with stud bolts disposed around the shaft passage opening in said wall and a first clamping ring having a central opening and mounting holes which are aligned with a corresponding central opening and bores in said annular member, between which said annular member and said first clamping ring and said wall, respectively, said annular sealing lips are retained by clamping together of said first clamping ring and said annular member with nuts on ends of stud bolts opposite said wall.

8. An assembly according to claim 7, each of said stud bolts with a clearance in said bores for radial adjustment of said stuffing box to said shaft.

9. An assembly according to claim 7, said annular sealing lip extends outwardly to the outer cylindrical surface of said annular member and is provided with insertion holes aligned with said bores in said annular member and thus with said stud bolts.

10. An assembly according to claim 7, wherein an end of said stuffing box juxtaposed to a wall of said room having an atmosphere to be contained is provided with a second clamping ring corresponding to said first clamping ring for provision of a complete, removable stuffing box for nonrotatable positioning of said opening for passage of a shaft in said wall with the aid of a sealing ring having a U-shaped cross-section and an outwardly opening groove for placing against an edge of said shaft passage opening in said wall, an inner surface of said sealing ring being in sealing engagement with an outer surface of said annular member.

* * * * *